(12) United States Patent
Corso (10) Patent No.: US 9,031,374 B2
(45) Date of Patent: May 12, 2015

(54) OPTICAL FIBER GUIDE DEVICE

(75) Inventor: Francois Corso, St-Martin-de-Bavel (FR)

(73) Assignee: Conductix Wampfler France, Gennevilliers (FR)

( * ) Notice: Subject to any disclaimer, the term of this patent is extended or adjusted under 35 U.S.C. 154(b) by 0 days.

(21) Appl. No.: 13/824,999

(22) PCT Filed: Nov. 8, 2011

(86) PCT No.: PCT/EP2011/069584
§ 371 (c)(1),
(2), (4) Date: Jul. 9, 2013

(87) PCT Pub. No.: WO2012/062719
PCT Pub. Date: May 18, 2012

(65) Prior Publication Data
US 2013/0279870 A1    Oct. 24, 2013

(30) Foreign Application Priority Data

Nov. 8, 2010    (FR) ...................................... 10 59215

(51) Int. Cl.
*G02B 6/00* (2006.01)
*C03B 37/027* (2006.01)
*C03B 37/03* (2006.01)

(52) U.S. Cl.
CPC ............ *G02B 6/00* (2013.01); *C03B 37/02745* (2013.01); *C03B 37/032* (2013.01); *C03B 2203/19* (2013.01); *C03B 2203/36* (2013.01); *C03B 2205/06* (2013.01)

(58) Field of Classification Search
CPC ...... G02B 6/3825; G02B 6/4459; G02B 6/25; G02B 6/00; G02B 6/3897
USPC ................................... 385/134, 135, 136, 137
See application file for complete search history.

(56) References Cited

U.S. PATENT DOCUMENTS 5,418,881 A    5/1995    Hart et al.
6,324,872 B1    12/2001    Blaszyk et al.
(Continued)

FOREIGN PATENT DOCUMENTS

FR            2967155        11/2010
WO    WO 2012/062719    5/2012

*Primary Examiner* — Jennifer Doan
(74) *Attorney, Agent, or Firm* — Blakely Sokoloff Taylor & Zafman (57) ABSTRACT

The invention relates to a device for guiding an optical fiber (2), which is intended to be mounted on a vertical tower (T) for manufacturing an optical fiber (2), the fiber being produced from an oven (18) located at the upper portion of the tower (T) and being moved vertically downward relative to the tower (T), the guide device (1) being located downstream of the oven (18), the device including: a first guide pulley (10), at least one surface (1220) for twisting the fiber (2), which is located downstream of the first guide pulley (10), a second guide pulley (14) located downstream of the at least one surface (1220) for twisting the fiber (2), and a deflecting pulley (16), the distance (C) between the first guide pulley (10) and the at least one surface for twisting the fiber (1220) being greater than the distance (D) between the at least one surface for twisting the fiber (1220) and the second pulley (14), the device being characterized in that it timber includes a second surface (1222) for twisting the optical fiber (2), wherein the two surfaces (1220, 1222) for twisting the optical fiber (2) are the two sides of a groove formed in a single twisting pulley (122).

11 Claims, 7 Drawing Sheets

(56) References Cited

U.S. PATENT DOCUMENTS

| | | |
|---|---|---|
| 2001/0020374 A1 | 9/2001 | Roba et al. |
| 2004/0232571 A1 | 11/2004 | Tong et al. |
| 2006/0133751 A1 | 6/2006 | Chen et al. |
| 2012/0207439 A1* | 8/2012 | Okada .......................... 385/146 |

* cited by examiner

FIG. 1
(State of the art)

FIG. 2a
(State of the art)

FIG. 2b
(State of the art)

FIG. 2c
(State of the art)

OPTICAL FIBER GUIDE DEVICE

The invention relates to devices for fabricating optical fibers. More particularly, the invention concerns optical fiber twisting devices used in a method for fabricating the said optical fiber.

Figure 1:
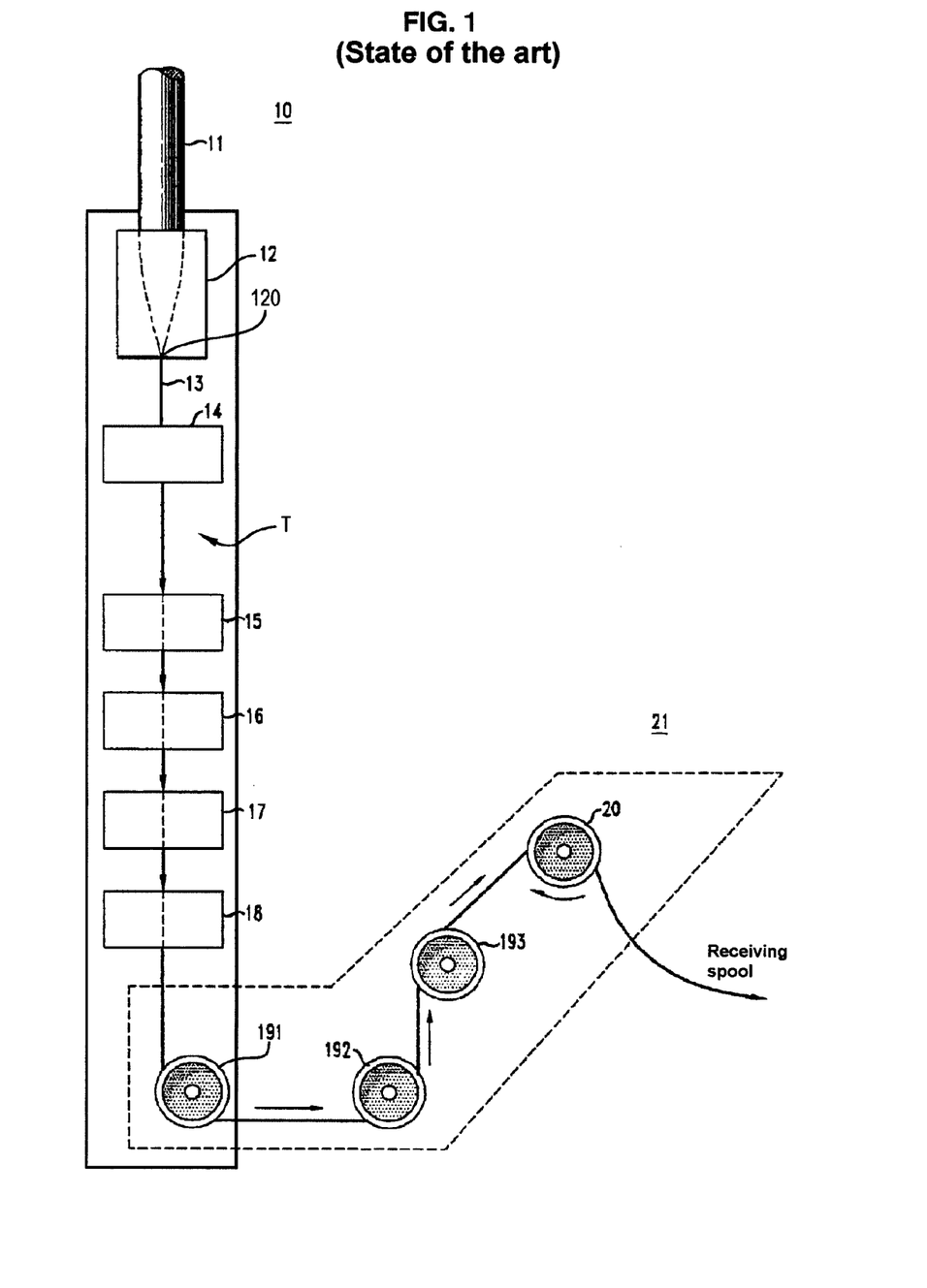
FIG. 1 schematically illustrates a prior art optical fiber drawing tower.

With reference to FIG. 1 (taken from document U.S. Pat. No. 5,418,881) a known method for making optical fiber in the prior art comprises a furnace 12 in which glass is heated, preferably as a preform (glass rod). The furnace is generally located at a height, preferably at the top of a tower T having a height generally reaching 20 to 35 meters.

The furnace 12 comprises an outlet opening 120 located in the lower part of the furnace 12 facing the bottom of the tower. From this opening 120 there emerges a partly molten glass cane (i.e. whose rheology allows casting from this opening). This cane forms the optical fiber.

Underneath the furnace there is a cooling zone 14 through which the optical fiber is cooled.

Once the optical fiber 13 is cooled, it continues travelling downwards into additional processing stations 15, 16, 17, 18 positioned downstream for operations such as cladding for example.

The optical fiber 13 is then taken in charge by one or more deflecting pulleys as far as a winder which winds the fiber around a spool which is subsequently used for transport and delivery of the said spool. Therefore, to install the fiber, all that is required is to unwind the optical fiber from the spool.

With further reference to FIG. 1, a fiber twisting method is known whose purpose is to reduce Polarization Mode Dispersion abbreviated to "PMD". With this method, the fiber 13 undergoes twisting for more regular distribution along the fiber of any imperfections in the fiber 13 so as not to deteriorate its quality. The accumulation of imperfections at one localized spot in the fiber can deteriorate its bandwidth quite considerably.

Figure 2A:
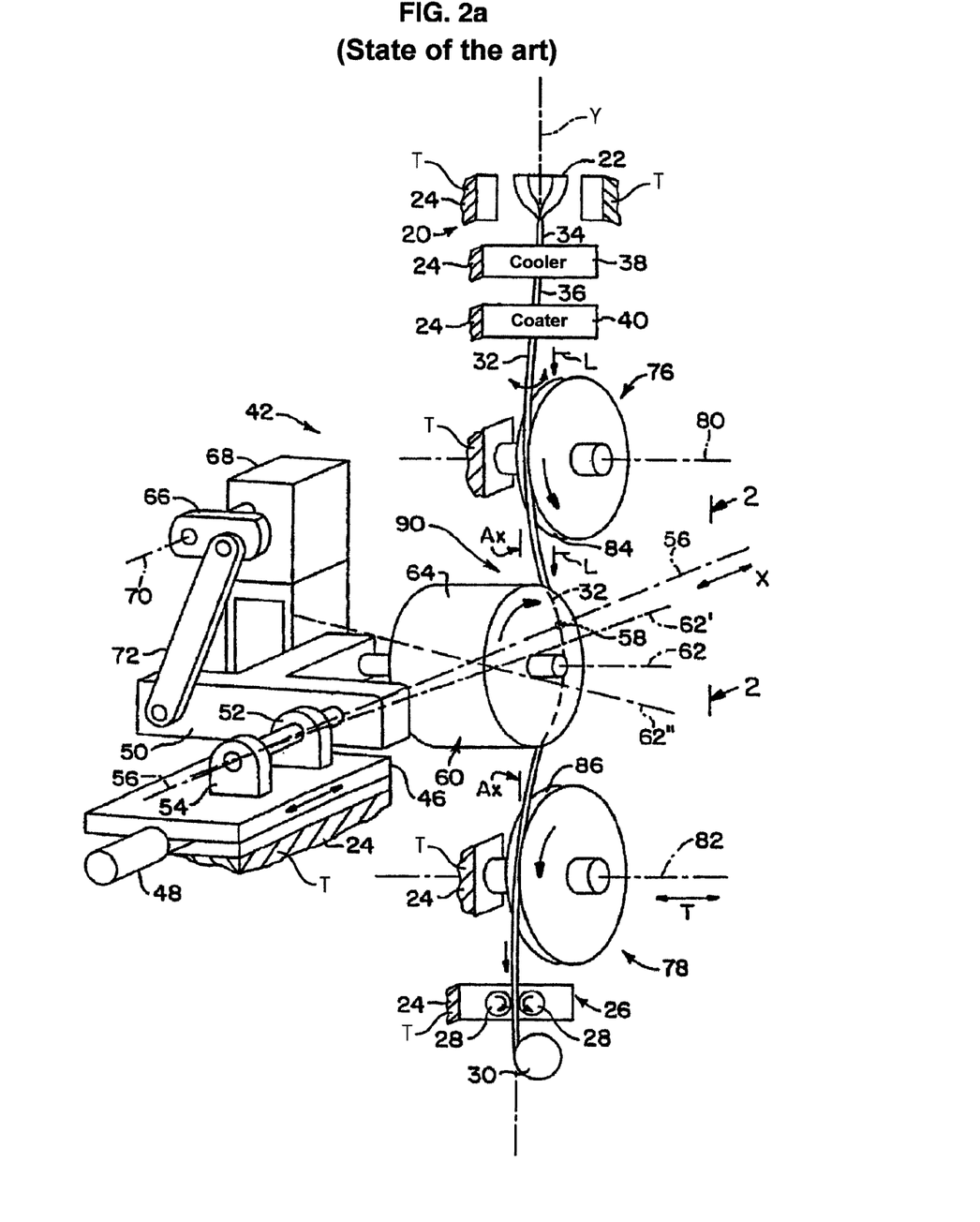
FIG. 2a is a cavalier projection of a guide device in the prior art.
Figures 2B, 2C:
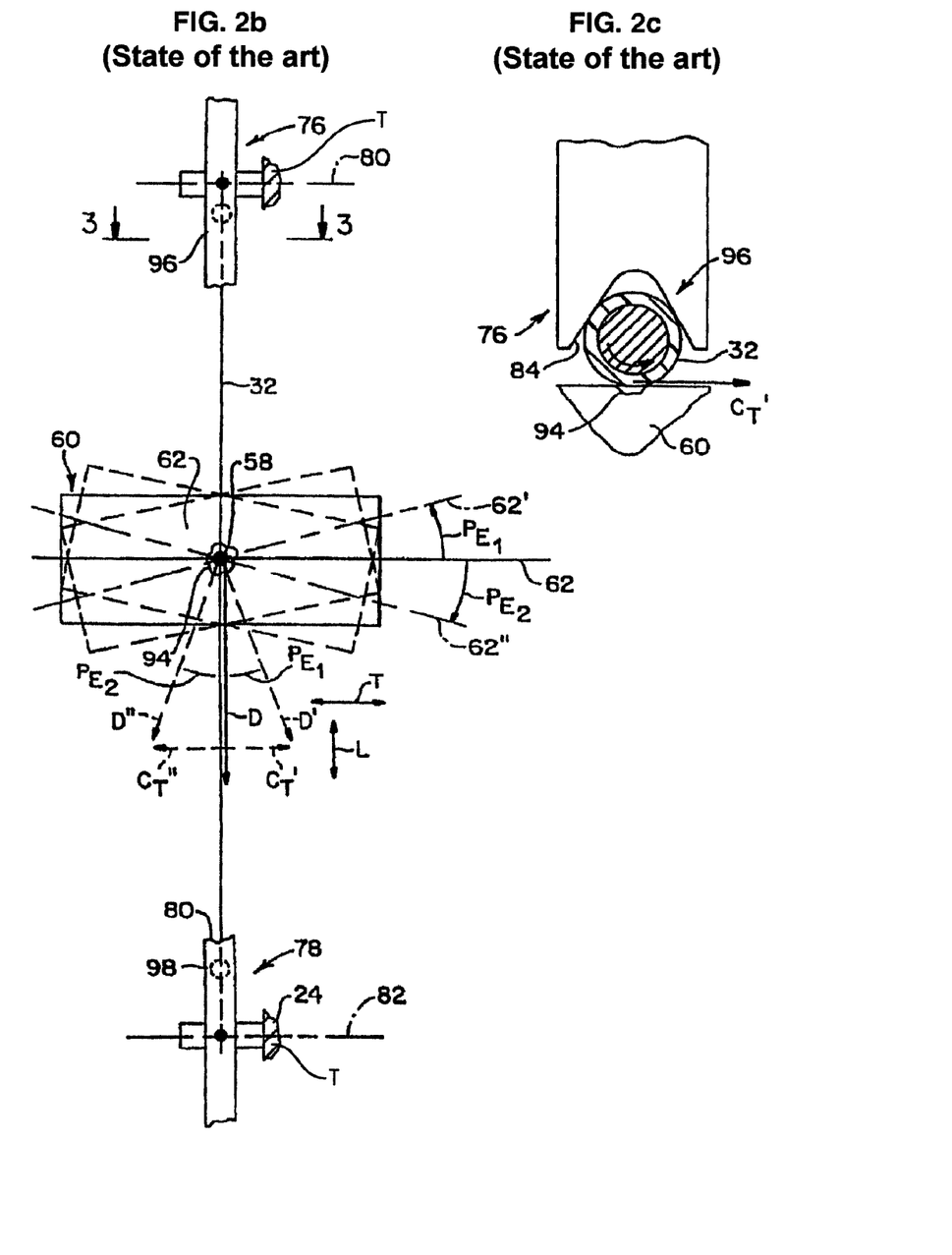

FIGS. 2a, 2b and 2c (taken from document U.S. Pat. No. 6,324,872) illustrate a guiding device for optical fiber 32 known in the prior art, intended to be mounted on a vertical tower T for drawing optical fiber 32. The optical fiber 32 is generated from the furnace 24 located in the top part of the tower T and travels vertically downwards relative to the tower T. The guide device is located downstream of the furnace 24 and comprises:
- a first guide pulley 76;
- a roller 60 positioned downstream of the first guide pulley 76 and whose axis of rotation lies at an angle to the horizontal. The roller 60 rotates around the axis 62 so that the surface 64 of the roller is in contact with the optical fiber 32 and generates a friction force D of which one component $C_T$ is horizontal. The horizontal component $C_T$ therefore causes twisting of the optical fiber 32 i.e. spinning of the fiber 32 (around its main axis Y vertical thereto);
- a second guide pulley 78 positioned downstream of the twisting roller 60 of the fiber 32.

Although this device known in the prior art effectively allows twisting to be generated within the fiber 32, criticisms have been leveled against it.

The generated twists have a tendency to propagate upstream but also downstream as far as the winding of the fiber. The fiber is then wound with these twists, which gives rise to inner forces making it difficult and even impossible to wind the fiber and also causing deterioration of the wound fiber over the long term.

It is therefore one objective of the present invention to provide an optical fiber guide device which allows the overcoming of this disadvantage.

More specifically, the objective of this invention is to provide an optical fiber guide device allowing twists to be generated within the said fiber which propagate upstream of the fiber, but to reduce or limit propagation of the twists downstream.

For this purpose, the invention concerns an optical fiber guide device intended to be mounted on a vertical tower for drawing optical fiber, the fiber being generated from a furnace located at the top part of the tower and travelling vertically downwards relative to the tower, the guide device being positioned downstream of the furnace, the device comprising:
- a first guide pulley;
- at least one fiber twisting surface located downstream of the first guide pulley;
- a second guide pulley located downstream of the at least one fiber twisting surface; and
- a deflecting pulley;

the distance between the first guide pulley and the at least one fiber twist surface being greater than the distance between the at least one fiber twisting surface and the second pulley.

Preferably, the device further concerns a second twisting surface for the optical fiber, the two twisting surfaces of the optical fiber being the two sidewalls of a groove formed in one same twisting pulley.

Advantageously, but optionally, the invention comprises at least one of the following additional characteristics:
- the ratio between the distance between the first guide pulley and the at least one fiber twisting surface and the distance between the at least one fiber twisting surface and the second pulley is between 2 and 20;
- the second pulley and the deflecting pulley are merged;
- the device comprises two optical fiber twisting surfaces arranged in succession;
- the angle separating the two sidewalls is between 50° and 120°;
- the diameter of the twisting pulley and the diameter of the second pulley have the same value;
- the twisting pulley is arranged on the arm of a servomotor so that the axis of rotation of the pulley can be rotationally controlled around a horizontal axis;
- the servomotor is arranged on a slide connection so that the rotational axis of the pulley can be controlled in horizontal translation relative to the drawing tower of the optical fiber;
- the servomotor comprises a command unit capable of controlling the rotation of the pulley's rotational axis in at least one of the following modes, the position of the rotational axis of the pulley being characterized by an angle away from a horizontal axis:
- the angle is fixed over time;
- the angle has a square wave over time of variable width but of fixed amplitude;
- the angle has a square wave over time of variable width and of randomly variable amplitude;
- the angle has a variable sinusoidal pulse over time but of fixed amplitude;
- the angle has a variable sinusoidal pulse over time of variable amplitude.

Other characteristics, objectives and advantages of the present invention will become apparent on reading the following detailed description of a non-limiting example given with reference to the appended Figures in which:

FIG. 2b is cross-sectional illustration of the device along 2-2 in FIG. 2a;

FIG. 2c is a cross-sectional illustration of the device along 3-3 in FIG. 2a;

Figure 3:
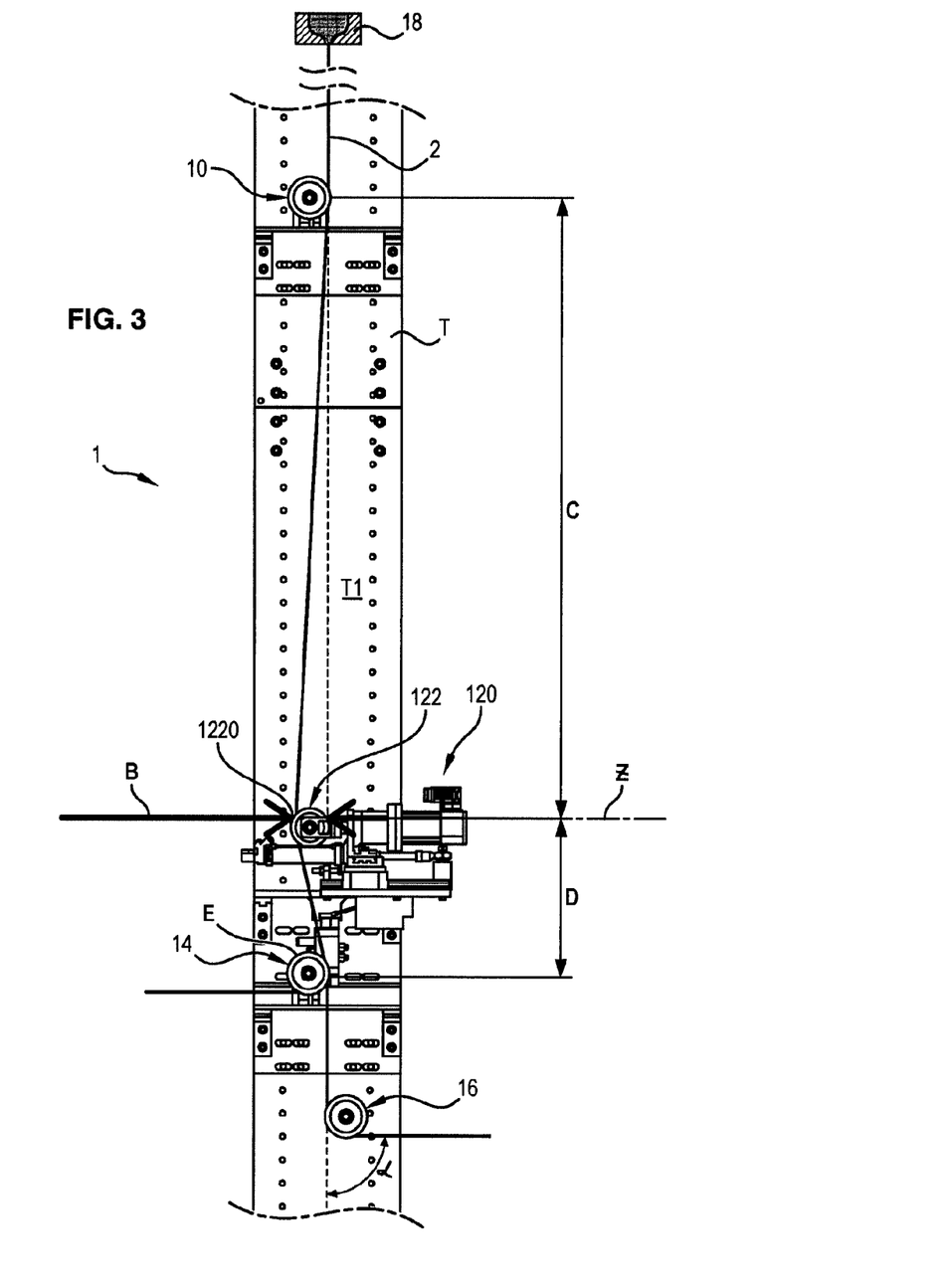
FIG. 3 is a schematic illustration of a guide device according to one particular embodiment of the present invention.

With reference to FIG. 3, an optical fiber guide device according to one particular embodiment of the present invention is intended to be mounted on a vertical tower T for fabricating optical fiber 2, the fiber being generated from a furnace 18 located at the top of the tower T and travelling vertically downwards in relation to the tower T. The fiber drawing rate (rate of travel of the fiber 2) is between 1 and 3000 m/min. The guide device 1 is positioned downstream of the furnace 18 and one or more fiber treatment stations may be positioned between the furnace and the guide device 1 e.g. a cladding station. The optical fiber guide device comprises:

- a first guide pulley 10; this is preferably mounted in rotation about a horizontal axis so that its sidewalls are parallel to the front face T1 of the tower T. This first pulley 10 is positioned so that the direction of the fiber upstream of the pulley is vertical. The pulley 10 is preferably of the type comprising a groove on the periphery of the pulley intended to receive the fiber 2;
- at least one surface 1220 twisting the fiber 2 located downstream of the first guide pulley 10 (this surface is described in more detail below);
- a second guide pulley 4 positioned downstream of the twisting surface 1220 of the fiber 2. This pulley is preferably of the same type as the first pulley 10 and is mounted in rotation about a horizontal axis so that its sidewalls are parallel to the front face T1 of the tower T. In addition, the second pulley 14 is mounted so that its rotational axis is parallel to the rotational axis of the first pulley 10, preferably contained in one same vertical plane;
- a deflecting pulley 16, preferably of the same type as the first and second pulleys 10 and 14, allowing the fiber to be deflected at an angle α relative to the vertical axis Y, α preferably being between 75° and 120° (in absolute value).

According to one characteristic of the present invention, the distance C between the first guide pulley 10 and the fiber twisting surface 1220 is greater than the distance D between the fiber twisting surface 1220 and the second guide pulley 14. More preferably, the ratio between the distance C separating the first guide pulley 10 from the fiber twisting surface 1220 and the distance D separating the fiber twisting surface 1220 from the second pulley 14 is between 2 and 20. Further preferably, for a height of a tower T of between 20 m and 30 m, the distance C is between 800 mm and 2500 mm and the distance D is between 150 mm and 400 mm.

Figure 4:
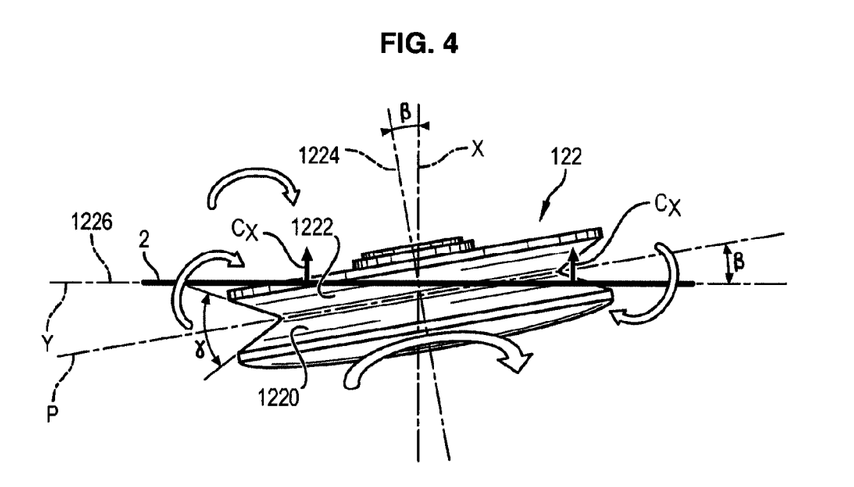
FIG. 4 illustrates a twisting pulley of a guide device according to one particular embodiment of the present invention.

With reference to FIG. 4, and according to one particular embodiment of the present invention, the device comprises two successive twisting surfaces 1220 and 1222 of the optical fiber 2. These two successive twisting surfaces 1220 and 1222 of the optical fiber 2 are the two sidewalls of a V-shaped groove along the periphery of one same twisting pulley 122. Preferably, the groove is of symmetrical V-shape i.e. the two sidewalls 1220 and 1222 of the groove are symmetrical relative to plane P which contains the junction 1223 of the sidewalls 1220 and 1222. Plane P is perpendicular to the rotational axis 1224 of the pulley 122. The twisting pulley 122 is arranged such that the optical fiber is not contained in plane P. In other words, the rotational axis of the pulley is not perpendicular to the optical fiber and has an angle β relative to axis X which is the horizontal axis perpendicular to the front face T1 of the tower T (and hence to the plane in FIG. 3). This offset of the pulley allows the sidewalls 1220 and 1222 to be in contact with the optical fiber 2, thereby allowing friction forces to be generated having a component Cx along axis X. This component Cx induces spinning of the fiber 2 i.e. the fiber 2 is twisted along its length. Preferably, the pulley 122 is in free rotation about its rotational axis so as to reduce any deterioration of the optical fiber or its cladding.

A twist is generally defined by the number of spins made by the fiber per meter. This value can be modified, in particular by acting on the friction force generated by the pulley 122 on the optical fiber 2.

The modification of the friction force can be generated by modifying the angle β of the rotational axis 1224 of the pulley 122 relative to axis X. The greater this angle β (the more the pulley 122 is offset) the greater the friction force, and hence the greater the generated twist.

Surprisingly, the present invention firstly allows the twists to be moved upstream of the pulley 122 as far as the furnace 18 and secondly allows the twists to be blocked downstream of the pulley 14 i.e. the fiber downstream of the pulley 14 contains a reduced number of twists.

Therefore, since the fiber downstream of the pulley 14 no longer has any residual twist, it can easily be used and wound without residual twist. There is therefore no risk of fiber deterioration.

Preferably, the two sidewalls 1220 and 1222 of the twisting pulley 122 lie at an angle γ of between 50° and 120° to each other. Optionally, the diameter of the twisting pulley 122 and the diameter of the second guide pulley 14 are substantially of the same value, preferably from 50 to 60 mm. The deflecting pulley 16 preferably has a diameter of 60 mm (in the prior art deflecting pulleys having a larger diameter are generally used e.g. 170 mm).

Figure 5:
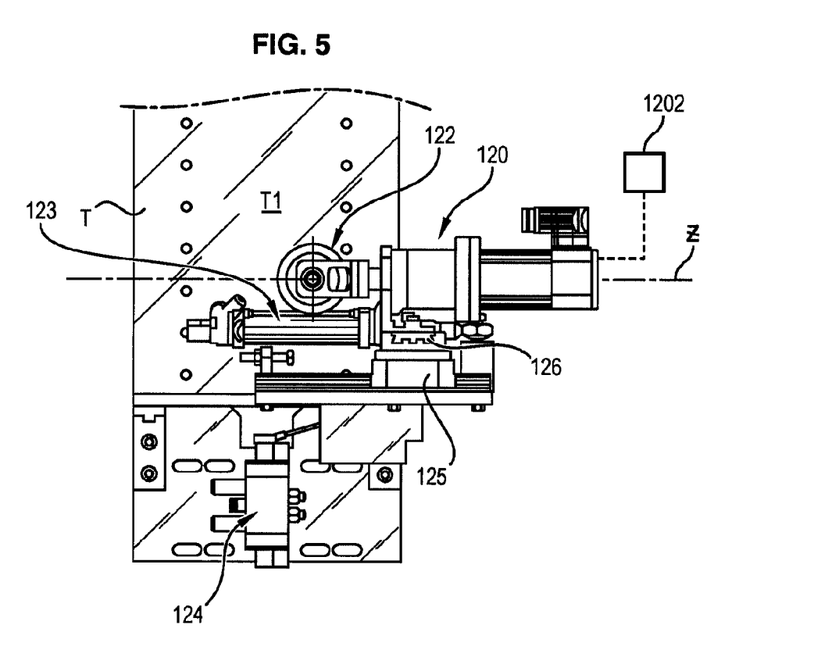
FIG. 5 schematically illustrates a twisting pulley controlled in accordance with one particular embodiment of the present invention.

With reference to FIG. 5, the twisting pulley 122 is preferably arranged on the arm of a servomotor 120 so that the rotational axis X of the pulley 122 can be controlled in rotation around a horizontal axis Z perpendicular to axes Y and X and hence parallel to plane T1. One advantage of the use of a servomotor is the easy modification of the angle between the rotational axis of the pulley 1224 and axis X, which is not the case with known prior art devices as illustrated in FIGS. 2a to 2c in which the modification of said axis is solely mechanical (by inter-positioned cam). Therefore, any modification in the behavior of the rotational axis of the roller required modification of the shape of the cam. With the device of the present invention, however, it is easily possible to modify the orientation of the rotational axis 1224 of the pulley 122 by merely changing the electrical command of the servomotor 120 without any other mechanical change.

It has been discovered that the use of randomly variable twists over time allows regular defects in the optical fiber to be prevented. The regularity of defects is also a degradation factor of the optical fiber's bandwidth.

Figure 6:
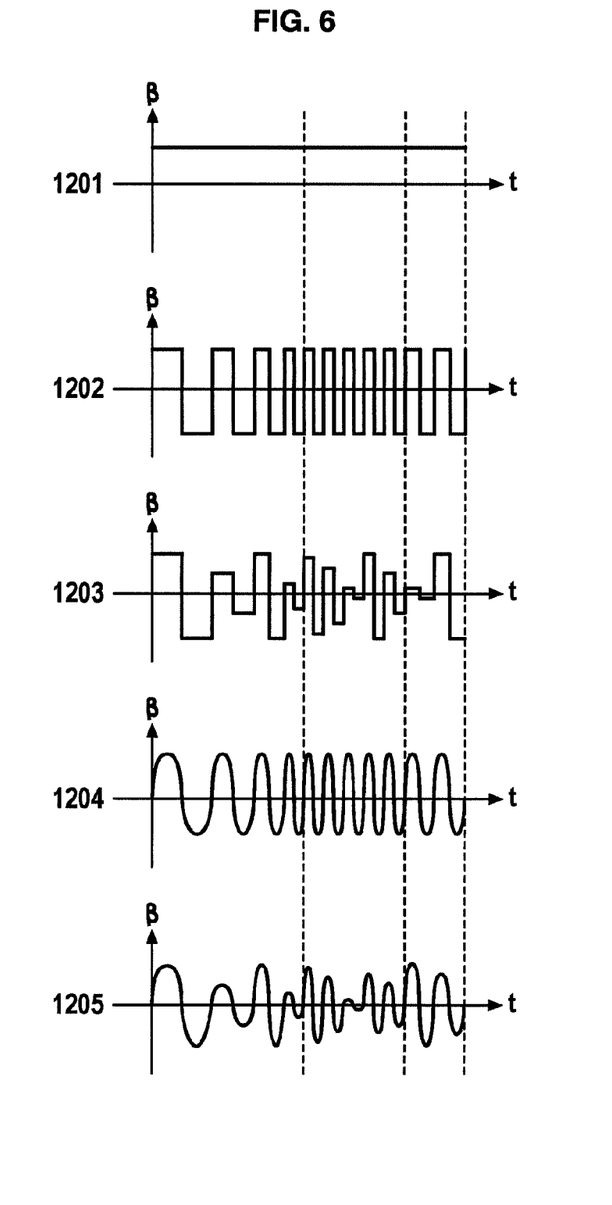
FIG. 6 illustrates different command modes of a twisting pulley according to one particular embodiment of the present invention.

With a device according to the present invention, said modification of twisting is simplified by mere electric commanding of the servomotor 120 for example via a control unit 1202. As an illustration, FIG. 6 shows different functioning modes:

a mode 1201 in which angle β is fixed over time;

a mode 1202 in which angle β has a square wave of variable width over time but of fixed amplitude;

a mode 1203 in which angle β has a square wave of variable width over time and of randomly variable amplitude;

a mode 1204 in which angle β has a variable sinusoidal pulse over time but of fixed amplitude;

a mode 1205 in which angle β has a variable sinusoidal pulse over time but of variable amplitude;

Evidently, other modes for modifying angle β of the pulley 122 are made possible by merely modifying the command signals of the servomotor 120. The amplitude of the variations in angle β is preferably calculated in relation to the rate of fiber drawing so that the generated twist is preferably between 0 and 12 spins/meter.

With reference again to FIG. 5, the servomotor 120 also allows horizontal translation of the pulley 122 along axis Z in relation to the tower T for fabricating the optical fiber 2. For this purpose, provision is made for example to mount the servomotor 120 on a horizontal ball slide with adjustable abutment 125, the servomotor 120 then being adjustable in horizontal position by means of a pneumatic cylinder 123 controlled by a pneumatic feed 124. Evidently, end-of-stroke sensors and/or micrometer tables can be provided to feedback information for commanding translation of the servomotor 120. Therefore, it is possible in particular to impart at least two horizontal positions to the servomotor 120:

a position P0 in which the pulley 122 is not contact with the optical fiber 2 (and hence does not generate twisting within the fiber);

a position P1 in which the pulley 122 is in contact with the optical fiber 2 (and hence generates twisting); this position is illustrated in FIG. 3.

As an example, the winding distance (distance B along axis Z travelled by the optical fiber 2 caused by pressure of the pulley 122 along axis Z in position P1) is 50 mm.

Figure 7:
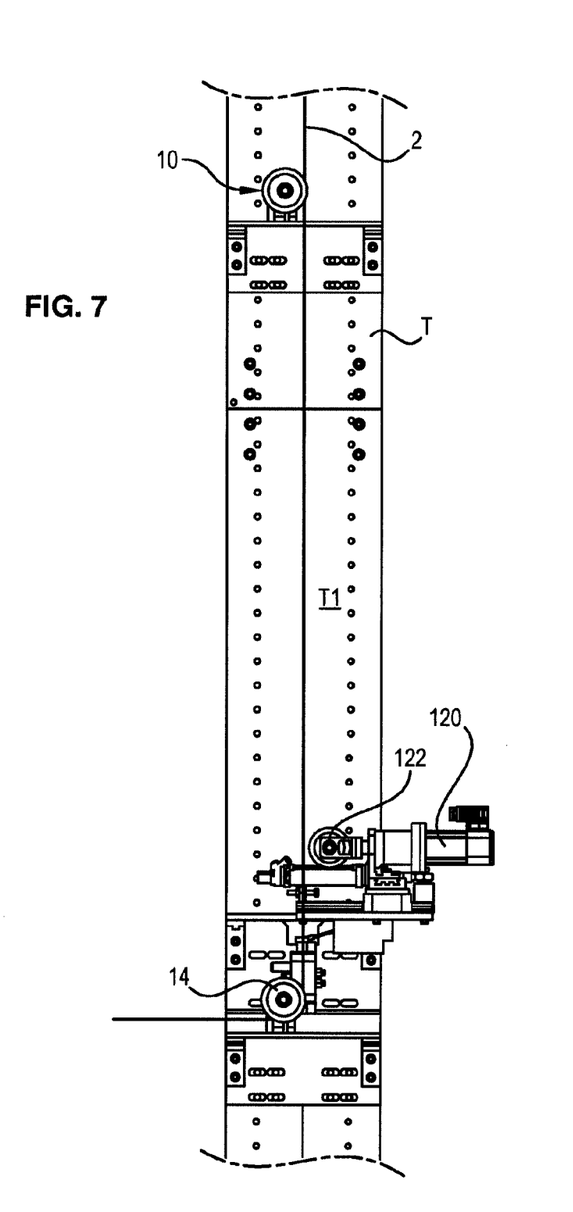
FIG. 7 is a schematic illustration of a guide device according to another particular embodiment of the present invention.

With reference to FIG. 7, the position P0 is illustrated. This figure also illustrates the embodiment in which the second pulley 14 and the deflecting pulley 16 are merged.

The invention claimed is:

1. An optical fiber guide device intended to be mounted on a vertical tower for fabricating optical fiber, the fiber being generated from a furnace located at the top part of the tower and moving vertically downwards relative to the tower, the guide device being positioned downstream of the furnace and comprising:

a first guide pulley;

a twisting pulley positioned downstream of the first guide pulley, the twisting pulley comprising first and second surfaces for twisting the fiber, said first and second surfaces being opposite sidewalls of a groove formed in the twisting pulley;

a second guide pulley positioned downstream of the twisting pulley; and a deflecting pulley, the distance between the first guide pulley and the first fiber twisting surface being greater than the distance between the first fiber twisting surface and the second guide pulley, wherein the twisting pulley is arranged on the arm of a servomotor so that the rotational axis of the twisting pulley is controllable in rotation around a horizontal axis.

2. The device according to claim 1, wherein the ratio between the distance between the first guide pulley and the first fiber twisting surface and the distance between the first fiber twisting surface and the second pulley is between 2 and 20.

3. The device according to claim 1 wherein the second guide pulley and the deflecting pulley are merged.

4. The device according to claim 1 wherein the first and second twisting surfaces of the optical fiber are arranged in succession.

5. The device according to claim 1 wherein the angle separating the first and second twisting surfaces is between 50° and 120°.

6. The device according to claim 1 wherein the diameter of the twisting pulley and the diameter of the second pulley have the same value.

7. The device according to claim 1 wherein the servomotor is arranged on a slide connection so that the rotational axis of the twisting pulley is controllable in horizontal translation relative to the tower for fabricating the optical fiber.

8. The device according to claim 1 or 7 wherein the servomotor comprises a command unit capable of controlling the rotation of the twisting pulley's rotational axis in accordance with at least one of the following modes, the position of the rotational axis of the twisting pulley being characterized by an angle β relative to a horizontal axis;

the angle (β) is fixed over time;

the angle (β) has a square wave of variable width over time but of fixed amplitude;

the angle (β) has a square wave of variable width over time and of randomly variable amplitude;

the angle (β) has a variable sinusoidal pulse over time but of fixed amplitude;

the angle (β) has a variable sinusoidal pulse over time and of variable amplitude.

9. The device of claim 1, wherein the groove of the twisting pulley is V-shaped.

10. The device of claim 9, wherein the groove of the twisting pulley is symmetrical with respect to a plane perpendicular to the rotation axis of the twisting pulley.

11. The device of claim 1, wherein the twisting pulley rotates freely around its rotation axis.

* * * * *